United States Patent [19]

Browning

[11] Patent Number: 4,894,046

[45] Date of Patent: Jan. 16, 1990

[54] CONTROL UNIT FOR CHAIN SHIFTER

[76] Inventor: Bruce W. Browning, 98 Union St., Seattle, Wash. 98101

[21] Appl. No.: 193,738

[22] Filed: May 13, 1988

[51] Int. Cl.⁴ .............................................. F16H 9/00
[52] U.S. Cl. ....................................... 474/78; 474/80
[58] Field of Search ....................... 474/69, 70, 78, 79, 474/80, 82, 160

[56] References Cited

U.S. PATENT DOCUMENTS

| | | | |
|---|---|---|---|
| 3,890,847 | 6/1975 | Dian | 474/80 |
| 3,919,891 | 11/1975 | Stuhlmuller et al. | 474/70 |
| 4,041,788 | 8/1977 | Nininger, Jr. | 474/80 |
| 4,127,038 | 11/1978 | Browning | 474/80 |
| 4,580,997 | 4/1986 | Browning et al. | 474/80 X |
| 4,605,240 | 8/1986 | Clem et al. | 474/80 X |
| 4,617,006 | 10/1986 | Nagano | 474/80 |
| 4,756,704 | 7/1988 | Nagano | 474/82 X |

FOREIGN PATENT DOCUMENTS 908832  4/1954  Fed. Rep. of Germany ........ 474/80

*Primary Examiner*—Jerome W. Massie
*Assistant Examiner*—Matthew Smith
*Attorney, Agent, or Firm*—Seed and Berry

[57] ABSTRACT

A control unit for a chain shifter using a reversible electric selector motor to position a cam selector within a pawl guide housing so that a traveling pawl will be directed as necessary for chain shifting.

10 Claims, 5 Drawing Sheets

CONTROL UNIT FOR CHAIN SHIFTER

BRIEF DESCRIPTION

1. Field of the Invention

This invention relates to the shifting of chains in chain driven devices to change the input to output drive ratios of the device. More particularly, it relates to shifting of chains to provide varying input to output drive ratios of bicycles and the like.

2. Prior Art

In my U.S. Pat. No. 4,127,038, there is disclosed a sprocket shift assembly wherein a chain is moved from sprocket to sprocket, with the sprockets being of different diameter, while maintaining a positive drive connection during shifting by tilting a portion of a receiving sprocket to align with the teeth of a chain entrained sprocket to receive the chain before resuming the untilted position with the chain entrained thereon.

In my U.S. Pat. No. 4,580,997, I have disclosed a two-speed sprocket and chain shift assembly with one sprocket having a small pivoted sprocket segment and means for shifting the chain from one sprocket to another upon pivoting of the sprocket segment and with the chain being entrained on one sprocket when an operating means is released. The patent also discloses the use of a pawl housing and pivotable cam to direct travel of a pawl carried by the sprocket as necessary to shifting or non-shifting of the sprocket and chain assembly. While the operating means disclosed does satisfactorily trigger movement of the chain from sprocket to sprocket, it is larger and more complex than is desired.

OBJECTS OF THE INVENTION

Accordingly, principal objects of the present invention are to provide apparatus that will more conveniently and easily shift a chain from sprocket to sprocket and that uses fewer parts and is more economical to construct than previously known control structures.

Other objects are to provide apparatus for shifting a chain from sprocket to sprocket that is electrically controlled, uses a minimum of power to effect shifting through a mechanical amplification system and that is reliable even after long periods of use.

Other objects are to provide a pawl guide housing and pivotable cam assembly that can be used with a sprocket assemblies and pawls of the general type disclosed in U.S. Pat. No. 4,580,997.

FEATURES OF THE INVENTION

Principal features of the present invention include a battery powered motor that can be operated as a drive means in either a forward or reverse direction to pivot a cam axle between centered and skewed cam setting positions and to hold the cam axle in the set positions with spring loaded balanced arms separated by a turnkey turned by the motor.

Additional objects and features of the invention will become apparent from the following detailed description and drawings.

THE DRAWINGS

In the drawings:

FIG. 1 is a side elevation of a bicycle equipped with the control unit for a chain shifter of the invention;

FIG. 2, an enlarged side elevation view of the control unit of the invention, shown mounted on a fragmentary bicycle frame;

FIG. 3, a side elevation view of the control unit;

FIG. 4, an enlarged cross sectional view, taken on the line 5—5 of FIG. 2 and showing the latch arms and key of the shifter;

FIG. 5, an enlarged end elevation view.

FIG. 6, a sectional view taken on line 6—6 of FIG. 3; and

FIG. 7, an exploded perspective view of the control unit;

DETAILED DESCRIPTION

Figure 1:
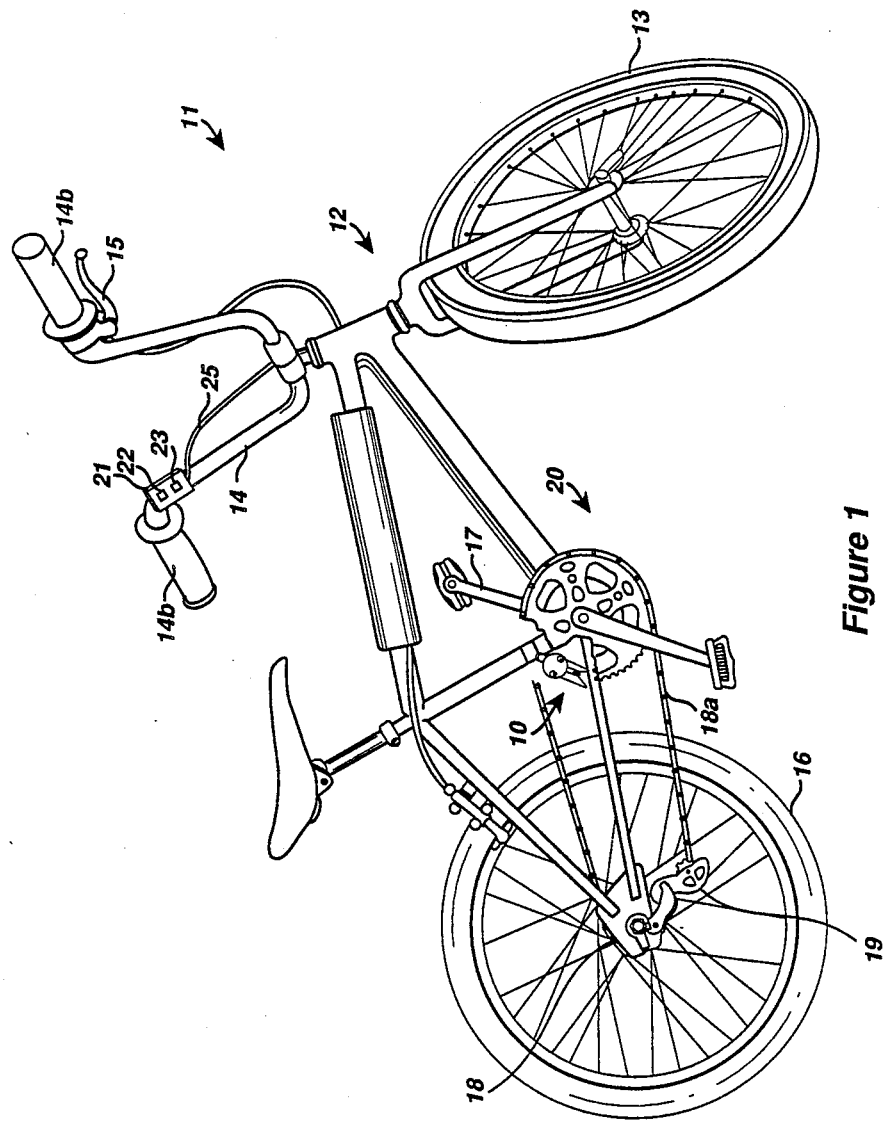

Referring to the drawings:

In the illustrated preferred embodiment, the control unit of the invention is shown generally at 10, mounted on a bicycle shown generally at 11. As shown, the bicycle 11 includes the usual frame 12, front wheel 13, handlebars 14, handlebrake control 15 adjacent one handlegrip 14a, rear wheel 16, pedal crank 17, rear sprocket 18 on the rear wheel, chain 18a, a chain tightener 19 and a sprocket assembly 20 on the crank. The sprocket assembly 20 is of the type disclosed in my U.S. Pat. No. 4,580,997, with a pivoted sprocket segment and a pawl that is directed through different travel paths to cause pivoting of the sprocket segment and shifting of a chain entrained on the sprocket assembly.

Figure 4:
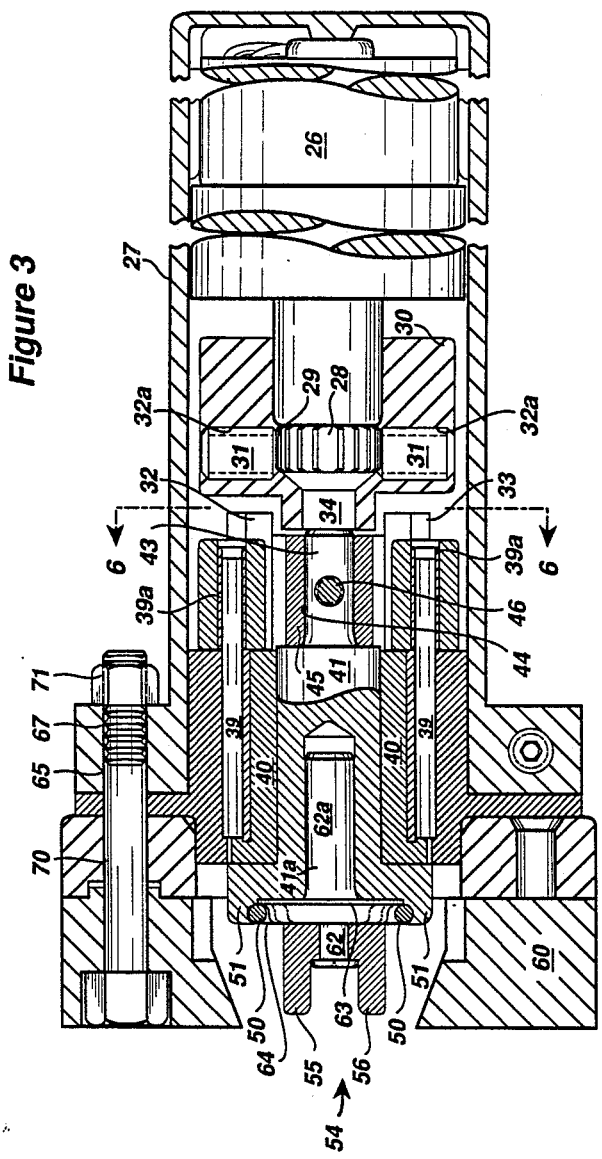
Figure 5:
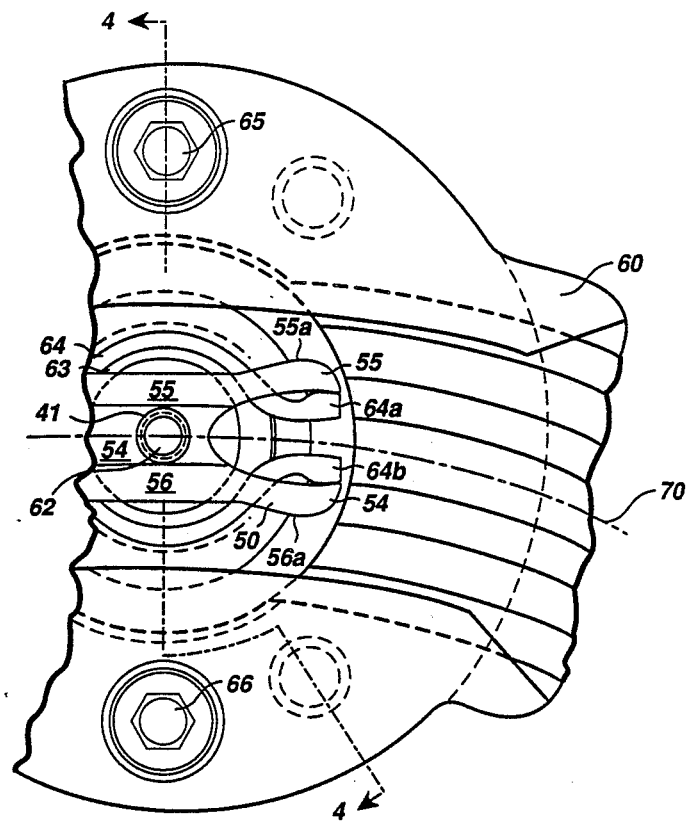
Figure 6:
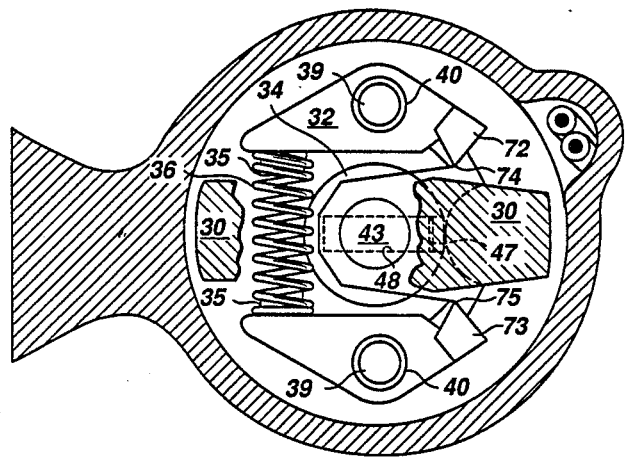
Figure 7:
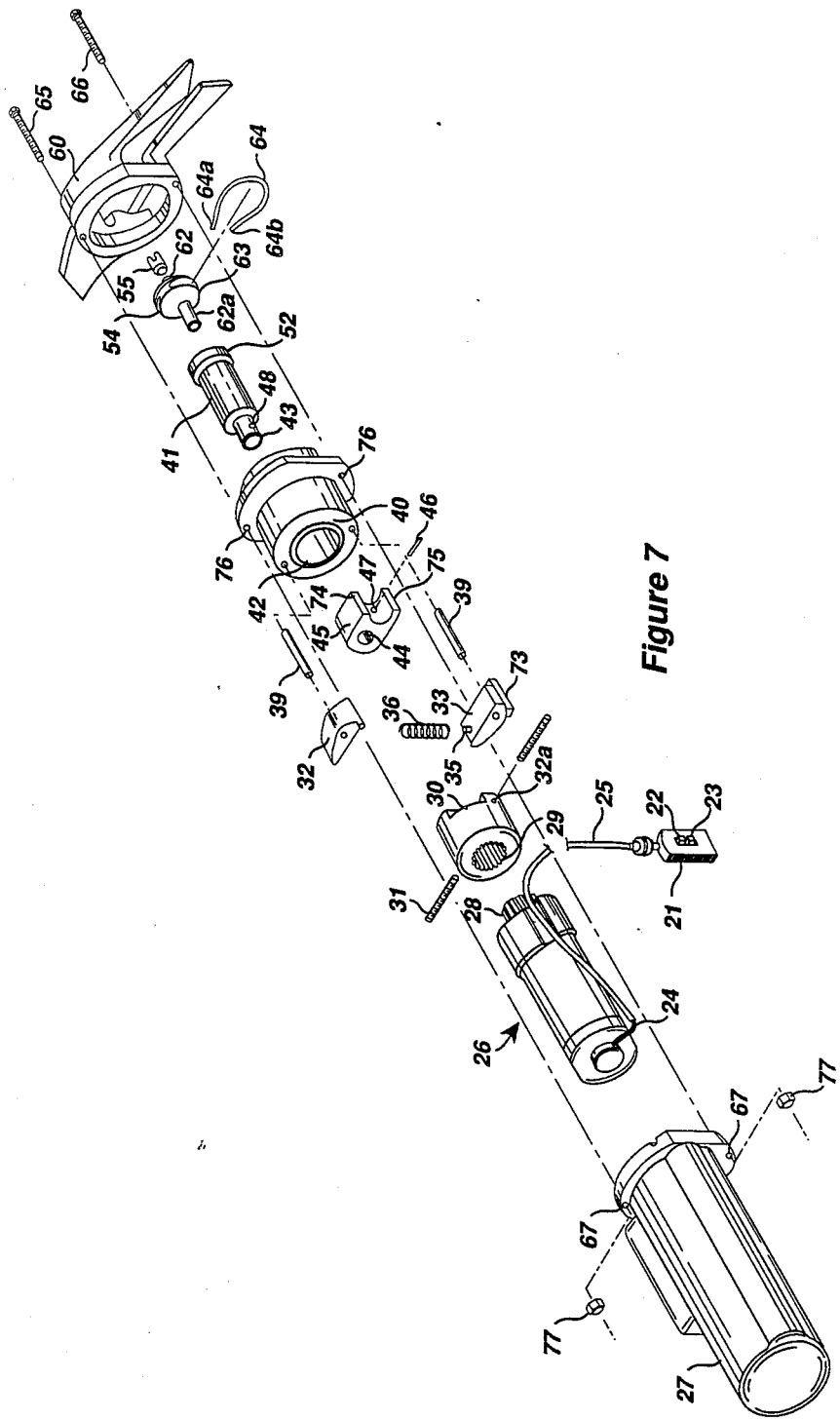

A control switch 21 is mounted adjacent on handlebars 14 adjacent to the other handle grip 14b and has an "UP" button 22 and a "DOWN" button 23. Electrical wires 24 (FIG. 2) extend through a protective sheath 25 from switch 21 to a reversible electric motor 26, FIGS. 4 and 7.

Motor 26 telescopes into a housing 27 that serves as a container for a battery, not shown, that provides power for the motor. A splined output shaft 28 of the motor 26 extends into a similarly splined bore 29 of a cam actuator 30 and the output shaft and cam actuator are held together by set screws 31 that are threaded through holes 32a in the cam actuator and that engage the output shaft 28.

A pair of latch arms 32 and 33 are respectively positioned at opposite sides of a lobe 34 on the face of cam actuator 30. A pin 35 projects from the face of each latch arm and a spring 36 is adapted to fit between the latch arms, with the ends of the spring telescoped over the pins and with the spring then biasing opposed end portions of the latch arms away from one another.

The latch arms 32 and 33 are each pivoted on a pin 39 that extends into a bushing 39a.

A spindle 41 telescopes into a bore 42 of the bushing 40 and a shaft 43 projecting from the spindle telescopes into a bore 44 of a key 45. A locking pin 46, inserted through a hole 47 in the key an a hole 48 in the shaft 43 locks the key to the shaft. When the locking unit is assembled, the key 45 is positioned between the latch arms 32 and 33.

A groove 50 is formed in a flange 51 that extends from a collar 52 on the spindle 41. A cam selector 54, which is generally of the type disclosed in my prior U.S. Pat. No. 4,580,997, and that has upper and lower cam surfaces 55 and 56 fits into a pawl guide housing 60, also generally of the type disclosed in my aforesaid U.S. Patent and that is fixed to bicycle frame 12. A pivot shaft 62 having a head projects through the cam selector 54 and is fixed to one side of a plate 63 that fits against collar 52. Another pin 62a at the opposite side of plate 63 telescopes into a central bore 41a of the spindle 41. A spring clip 64 snaps into groove 50 to hold the plate 63 against collar 51 and pin 62a in bore 41a. Ends 64a and 64b of the spring clip 64 respectively extend into engagement with the tail ends 55a and 56a of the cam surfaces 55 and 56, respectively, so that spring clip will turn in its groove 50 with turning of the cam activator 54 and the spring clip 64 will tend to center the cam surfaces 55 and 56 within the pawl guide housing 60.

Figure 2:
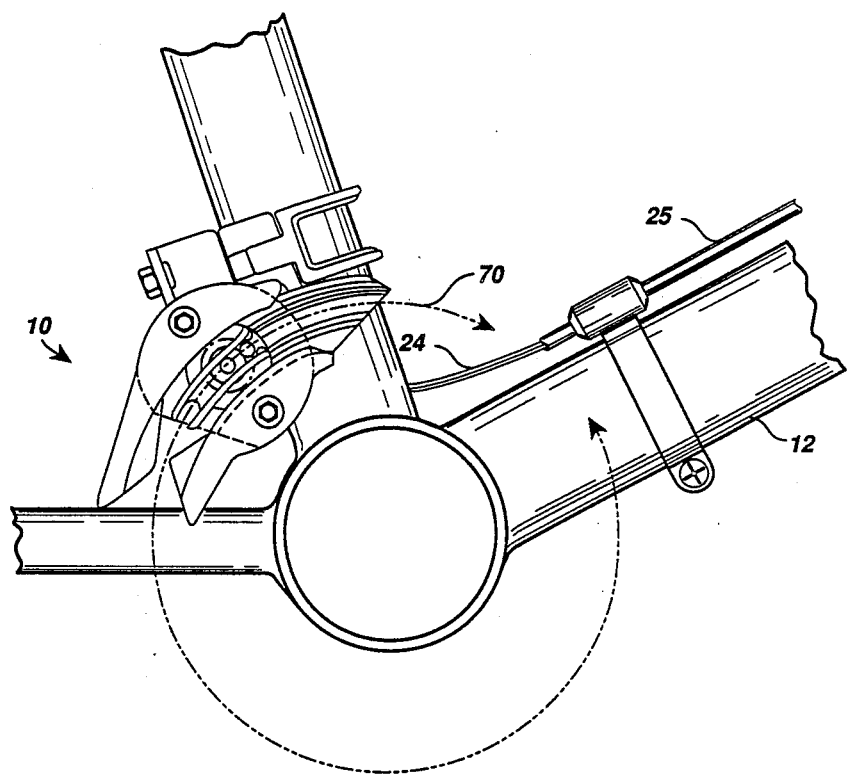
Figure 3:
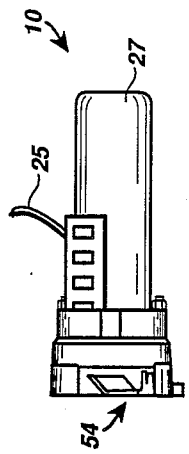

Bolts 65 and 66 are provided to lock the control unit components together. The bolts extend through holes 67 in a flange 68 of housing 27, holes 69 in a flange 76 of bushing 40 and are threaded into nuts 77. In operation, when the cam selector 54 is centrally positioned in the pawl guide housing, as shown in FIG. 2, the path (shown by arrow 70) of the pawl (not shown) is through the center guide path 71 of the cam selector. When the cam selector is in this position the latch arms 32 and 33 are in a balanced position at opposite sides of the lobe 34 and angled corners 72 and 73 of the latch arms 32 and 33 are respectively in engagement with sharp corner edges 74 and 75 of key 45.

Pushing "UP" switch 22 will provide an electrical pulse, i.e., in the order of magnitude of 30 miliseconds that will operate motor 26 to rotate the cam actuator 30 in a first rotational direction. This rotates lobe 34 to move one latch arm away from a corner edge 74 or 75 and allows the spring 36 to force the other latch arm to act against the key and to rotate the key in a first direction around the shaft 43. Rotation of the key is transmitted through the spindle 41 to the cam selector 54. The cam selector is thus skewed to direct the pawl above or below the center guide path. As the pawl passes through the available path it engages a curved cam guide surface tail portion, i.e. 55a or 56a, to force it back to the centered position.

Actuation of "DOWN" button 23 will cause the motor to operate in a reverse direction and to pivot the cam selector in an opposite direction.

Pivoting of the cam selector will then effect shifting of the chain in the manner disclosed in my aforesaid U.S. Pat. No. 4,580,997.

With the present invention only an extremely minute' electrical pulse is required to slightly rotate the cam activator 30. The small rotational force of the cam activator is then magnified as the spring 36 turns the latch arms to rotate and turn the latch key. The latch arms are returned to their latched position, i.e. with angled corners 72 and 73 in engagement with corner edges 74 and 75 of key 45 when the pawl moves past the cam selector 54.

With the control unit of the present invention, the cam follower does not interfere with back pedalling of the bicycle. Should an operator begin back pedalling while the cam selector is centered the pawl on the sprocket assembly will simply pass centrally through the cam selector. If back pedalling is initiated while the pawl is above or below the cam selector no binding will occur since the pivoted cam selector 54 and spring clip 64 will rotate to allow passage of the pawl.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A control unit for a chain shifter comprising:
   a reversible electric selector motor;
   a pawl guide housing having a pawl guideway formed therethrough;
   a cam selector pivotably connected in the pawl guideway;
   a pair of pivoted latch arms;
   a lobe positioned between the latch arms and driven by the motor;
   spring means biasing portions of the latch arm apart;
   a key positioned between the latch arms and held by the latch arms and the spring when the lobe is centered and turned by the latch arms when the lobe is turned off center by the motor; and
   means transmitting rotary motion of the key to the cam selector.

2. A control unit as in claim 1, wherein the means transmitting rotary motion of the key to the cam selector comprises
   a spindle connected to a rotational axis of the key;
   a flange carried by the spindle;
   coupling means at the periphery of the flange for coupling to the cam selector; and
   means carried by the cam selector outward of the pivot axis thereof to engage the coupling means.

3. A control unit as in claim 2, wherein the coupling means at the periphery of the flange for coupling to the cam selector comprises
   a plate pivotally connected to the cam selector; and
   means pivotally connecting the plate to the spindle.

4. A control unit as in claim 3, wherein the means pivotally connecting the plate to the spindle comprises
   a bore in the spindle;
   a pin fixed to and projecting from the pate at a side opposite the cam selector and extending into the bore in the spindle;
   a groove in the flange carried by the spindle, said groove encircling the flange; and
   a spring clip removably fitted into the groove to project therefrom and to hold the plate against the flange.

5. A control unit as in claim 4, wherein
   the cam selector has cam surfaces thereon to be engaged by a pivot passing thereover or therebeneath and to center the cam selector.

6. A control unit for a chain shifter comprising:
   a drive means;
   a pivotable cam selector;
   a pair of pivoted latch arms;
   a lobe positioned between the latch arms and driven by the motor;
   spring means biasing portions of the latch arm apart;
   a key positioned between the latch arms and held by the latch arms and the spring when the lobe is centered and turned by the latch arms when the lobe is turned off center by the drive means; and
   means transmitting rotary motion of the key to the cam selector.

7. A control unit as in claim 6, wherein the means transmitting rotary motion of the key to the cam selector comprises
   a spindle connected to a rotational axis of the key;
   a flange carried by the spindle;
   coupling means at the periphery of the flange for coupling to the cam selector; and
   means carried by the cam selector outward of the pivot axis thereof to engage the coupling means.

8. A control unit as in claim 7, wherein the coupling means at the periphery of the flange for coupling to the cam selector comprises a plate pivotally connected to the cam selector; and means pivotally connecting the plate to the spindle.

9. A control unit as in claim 8, wherein the means pivotally connecting the plate to the spindle comprises a bore in the spindle;

a pin fixed to and projecting from the plate at a side opposite the cam selector and extending into the bore in the spindle;

a groove in the flange carried by the spindle, said groove encircling the flange; and a spring clip removably fitted into the grooves to project therefrom and to hold the plate against the flange.

10. A control unit as in claim 9, wherein the cam selector has cam surfaces thereon to be engaged by a pawl passing thereover or therebeneath and to center the cam selector.

* * * * *